US010006989B1

United States Patent
Yamazaki

(10) Patent No.: US 10,006,989 B1
(45) Date of Patent: *Jun. 26, 2018

(54) DISABLING ROBOT SENSORS

(71) Applicant: Schaft Inc., Tokyo (JP)

(72) Inventor: Shuntaro Yamazaki, Tokyo (JP)

(73) Assignee: Schaft Inc., Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/449,163

(22) Filed: Mar. 3, 2017

Related U.S. Application Data

(63) Continuation of application No. 14/819,874, filed on Aug. 6, 2015, now Pat. No. 9,625,571.

(51) Int. Cl.
  *G01S 7/495* (2006.01)
  *B25J 9/16* (2006.01)
  *H04B 10/116* (2013.01)

(52) U.S. Cl.
  CPC ............. *G01S 7/495* (2013.01); *B25J 9/1674* (2013.01); *B25J 9/1697* (2013.01); *H04B 10/116* (2013.01); *Y10S 901/01* (2013.01); *Y10S 901/47* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 5,202,661 A * | 4/1993 | Everett, Jr. | .......... | G05D 1/0255 340/522 |
| 7,012,551 B2 * | 3/2006 | Shaffer | ..................... | B60R 1/00 315/82 |
| 7,509,213 B2 * | 3/2009 | Choi | .................... | G05D 1/0225 318/568.12 |

(Continued)

FOREIGN PATENT DOCUMENTS

EP  2023160 B1  10/2009

OTHER PUBLICATIONS

Naimark, "How to ZAP a Camera: Using Lasers to Temporarily Neutralize Camera Sensors", New York Times (2010).

(Continued)

*Primary Examiner* — Jonathan L Sample
(74) *Attorney, Agent, or Firm* — Honigman Miller Schwartz and Cohn LLP

(57) ABSTRACT

Example implementations may relate to methods and systems for disturbing or deceiving sensors of robotic devices. Accordingly, a computing system may detect that a robotic device has entered a particular physical region. Responsively, the computing system may then determine at least one type of sensor that is associated with the robotic device and is used to detect reflected illumination that is reflected from an object. Based on the determined at least one type of sensor, the computing system may then select (i) at least one particular type of disturbing illumination and (ii) a target location within the particular physical region. Upon the selection, the computing system may direct at least one light source to emit the selected at least one particular type of disturbing illumination towards the selected target location so as to disturb the reflected illumination detectable by the robotic device using the at least one type of sensor.

20 Claims, 8 Drawing Sheets

(56) References Cited

U.S. PATENT DOCUMENTS

| | | | | |
|---|---|---|---|---|
| 8,175,743 | B2* | 5/2012 | Nara | G01B 11/002 356/152.3 |
| 8,781,627 | B2* | 7/2014 | Sandin | G05D 1/028 700/258 |
| 9,327,407 | B2* | 5/2016 | Jones | G05D 1/0219 |
| 9,392,920 | B2* | 7/2016 | Halloran | A47L 5/30 |
| 2002/0051128 | A1* | 5/2002 | Aoyama | G01S 7/4811 356/4.03 |
| 2004/0210344 | A1* | 10/2004 | Hara | B64C 33/025 700/245 |
| 2005/0134440 | A1* | 6/2005 | Breed | B60N 2/2863 340/435 |
| 2006/0058921 | A1* | 3/2006 | Okamoto | G05D 1/0214 700/255 |
| 2006/0129276 | A1* | 6/2006 | Watabe | G05D 1/0234 700/245 |
| 2007/0192910 | A1* | 8/2007 | Vu | B25J 5/007 700/245 |
| 2007/0250212 | A1* | 10/2007 | Halloran | A47L 5/30 700/245 |
| 2007/0285041 | A1* | 12/2007 | Jones | G05D 1/0219 318/568.12 |
| 2008/0039974 | A1* | 2/2008 | Sandin | G05D 1/0255 700/258 |
| 2010/0172136 | A1* | 7/2010 | Williamson, III | F41H 13/00 362/259 |
| 2010/0292884 | A1* | 11/2010 | Neumann | G05D 1/0225 701/25 |
| 2012/0078417 | A1* | 3/2012 | Connell, II | B25J 5/00 700/248 |
| 2012/0206336 | A1* | 8/2012 | Bruder | G01B 11/026 345/156 |
| 2013/0094668 | A1* | 4/2013 | Poulsen | H03G 3/301 381/107 |
| 2013/0105670 | A1* | 5/2013 | Borosak | B60Q 1/143 250/214.1 |
| 2013/0245937 | A1* | 9/2013 | DiBernardo | G01S 5/163 701/514 |
| 2013/0325244 | A1* | 12/2013 | Wang | G05D 1/028 701/26 |
| 2014/0074287 | A1* | 3/2014 | LaFary | G06N 3/008 700/253 |
| 2014/0088761 | A1* | 3/2014 | Shamlian | G05D 1/0238 700/253 |
| 2014/0222206 | A1* | 8/2014 | Mead | B35J 9/1697 700/259 |
| 2014/0280316 | A1* | 9/2014 | Ganick | G06F 17/30522 707/769 |
| 2015/0054639 | A1* | 2/2015 | Rosen | G06K 9/00785 340/439 |
| 2015/0168954 | A1* | 6/2015 | Hickerson | G01S 17/026 700/259 |
| 2015/0202770 | A1* | 7/2015 | Patron | G05D 1/024 700/245 |
| 2015/0234385 | A1* | 8/2015 | Sandin | G05D 1/0265 700/258 |
| 2016/0121487 | A1* | 5/2016 | Mohan | B25J 13/006 700/248 |
| 2016/0285842 | A1* | 9/2016 | Booth | H04L 63/08 |

OTHER PUBLICATIONS

Solomon, "Maritime Deception and Concealment; Concepts for Defeating Wide-Area Oceanic Surveillance Reconnaissance-Strike Networks", Naval War College Review, vol. 66 (2013).

* cited by examiner

DISABLING ROBOT SENSORS

CROSS REFERENCE TO RELATED APPLICATION

The present application claims priority to U.S. patent application Ser. No. 14/819,874, filed on Aug. 6, 2015 and entitled "Disabling Robot Sensors," which is hereby incorporated by reference in its entirety.

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems capable of safely working in various environments becomes apparent. Therefore, a demand for such robotic systems has helped open up a field of innovation in safety techniques, sensing techniques, as well as component design and assembly.

SUMMARY

According to an example implementation, a computing system may detect that a robotic device has entered or is about to enter a particular physical region. Once the computing system make this detection, the computing system may then determine a type of sensor system that is used the robotic device to interact with the environment. Generally, such a sensor system may emit source illumination or assume external source illumination that is reflected off objects to result in reflected illumination detectable by the robotic device. Then, based on the determined sensor system, the computing system may select (i) a particular type of disturbing illumination and (ii) a target location within the particular physical region. Upon the selection, the computing system may then direct a light source to emit the selected type of disturbing illumination towards the selected target location so as to disturb the reflected illumination detectable by the robotic device using the sensor system. In this manner, the disturbing illumination could disturb the sensor system or could deceive the sensor system to cause a change in operation of the robotic device, among other possible outcomes.

In one aspect, a method is provided. The method involves detecting, by a computing system, that a robotic device has entered a particular physical region. The method also involves, in response to detecting that the robotic device has entered the particular physical region, the computing system determining at least one type of sensor associated with the robotic device, where the at least one type of sensor is used to detect reflected illumination that is reflected from at least one object. The method additionally involves, based on the determined at least one type of sensor, the computing system selecting (i) at least one particular type of disturbing illumination and (ii) a target location within the particular physical region. The method further involves the computing system directing at least one light source to emit the selected at least one particular type of disturbing illumination towards the selected target location so as to disturb the reflected illumination detectable by the robotic device using the at least one type of sensor.

In another aspect, a system is provided. The system includes at least one light source, one or more processors, and a non-transitory computer readable medium. The system also includes program instructions stored on the non-transitory computer readable medium and executable by the one or more processors to detect that a robotic device has entered a particular physical region. The program instructions are also executable to, in response to detecting that the robotic device has entered the particular physical region, determine at least one type of sensor associated with the robotic device, where the at least one type of sensor is used to detect reflected illumination that is reflected from at least one object. The program instructions are additionally executable to, based on the determined at least one type of sensor, select (i) at least one particular type of disturbing illumination and (ii) a target location within the particular physical region. The program instructions are further executable to direct the at least one light source to emit the selected at least one particular type of disturbing illumination towards the selected target location so as to disturb the reflected illumination detectable by the robotic device using the at least one type of sensor.

In yet another aspect, a non-transitory computer readable medium is provided. The non-transitory computer readable medium has stored therein instructions executable by one or more processors to cause a computing system to perform functions. The functions include detecting that a robotic device has entered a particular physical region. The functions also include, in response to detecting that the robotic device has entered the particular physical region, determining at least one type of sensor associated with the robotic device, where the at least one type of sensor is used to detect reflected illumination that is reflected from at least one object. The functions additionally include, based on the determined at least one type of sensor, selecting (i) at least one particular type of disturbing illumination and (ii) a target location within the particular physical region. The functions further include directing at least one light source to emit the selected at least one particular type of disturbing illumination towards the selected target location so as to disturb the reflected illumination detectable by the robotic device using the at least one type of sensor.

In yet another aspect, a system is provided. The system may include means for detecting that a robotic device has entered a particular physical region. The system may also include means for, in response to detecting that the robotic device has entered the particular physical region, determining at least one type of sensor associated with the robotic device, where the at least one type of sensor is used to detect reflected illumination that is reflected from at least one object. The system may additionally include means for, based on the determined at least one type of sensor, selecting (i) at least one particular type of disturbing illumination and (ii) a target location within the particular physical region. The system may further include means for directing at least one light source to emit the selected at least one particular type of disturbing illumination towards the selected target location so as to disturb the reflected illumination detectable by the robotic device using the at least one type of sensor.

These as well as other aspects, advantages, and alternatives will become apparent to those of ordinary skill in the art by reading the following detailed description, with reference where appropriate to the accompanying drawings.

DETAILED DESCRIPTION

Figure 1A:
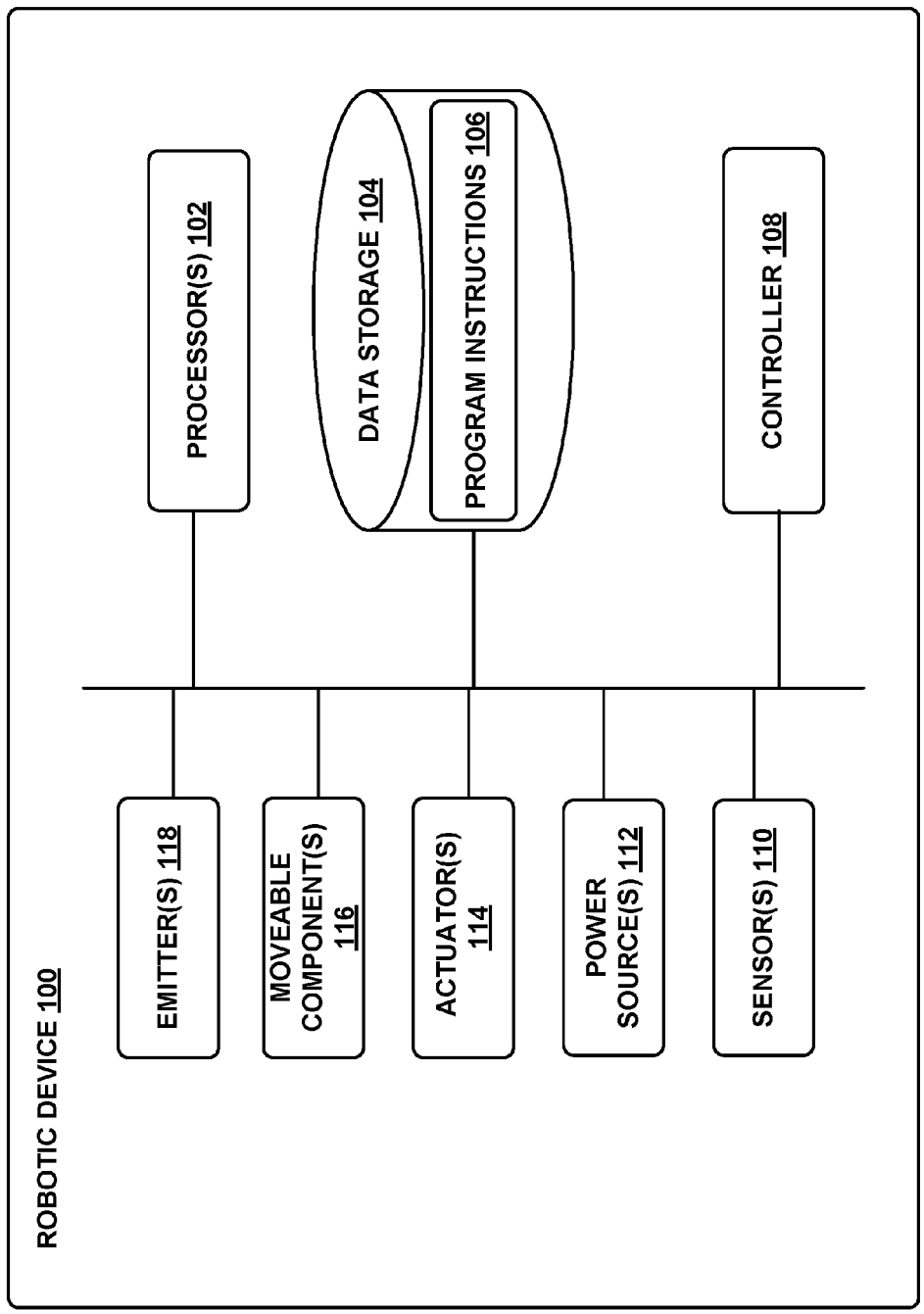
FIG. 1A illustrates components of an example robotic device, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

According to various implementations, described herein are methods and systems for using disturbing illumination to disable, mislead, or otherwise disturb sensor systems of robotic devices, such as optical depth sensors for instance. In some examples, a robotic device may use a sensor system that may emit source illumination that is then reflected from objects in the environment and is then detected by such sensors so as to gain data about the environment in which the robotic device is operating. These sensors may include a light detection and ranging (LIDAR) device, a time-of-flight camera, and/or a structured light scanner, among others. In other examples, sensor systems such as stereo cameras could use other sources of illumination (e.g., natural lighting) that is reflected from objects in the environment and is then detected so as to gain data about the environment in which the robotic device is operating.

As a robotic device uses data from one or more such sensor systems to interact with and move around the environment, the robotic device may sometimes seek to enter restricted zones, such as a restricted zone within a manufacturing facility, or may otherwise seek to operate in a region where the robotic device should not operate, such as due to safety considerations or for other reasons. Within examples, a system may use disturbing illumination to keep robotic devices away from such regions or to cause the robotic devices to exit such regions, among other possible uses.

Accordingly, a computing system may be in communication with light sources, light detectors, and/or various sensors each positioned within or in the vicinity of a physical region. With this arrangement, the computing system can detect that a robotic device has entered or is about to enter the physical region. To do so, the computing system could receive from a light detector information representative of detection of source illumination that is emitted from a sensor system (e.g., a depth sensor) of the robotic device, but could also do so in other ways.

Once the computing system detects that the robotic device has entered or is about to enter the physical region, the computing system may responsively determine at least one type of sensor system being used by the robotic device. For instance, the computing system may determine whether the robotic device is using a LIDAR device, a structured light scanner, a time-of-flight camera, and/or a stereo camera, among other possibilities. Then, once the computing system determines the type of sensor system used by the robotic device, the computing system may use the determined type of sensor system as basis for selecting a type of disturbing illumination to use.

In particular, the computing system may select a type of disturbing illumination that is most suitable for disturbing the determined sensor system. By way of example, a structured light scanner is a 3D scanning device for measuring the 3D shape of an object using projected light patterns and a camera system. Hence, to disturb a structured light scanner, the computing system may select a spatial variation taking the form of a pattern projection (e.g., a random dot projection) as the type of disturbing illumination that should be used. More specifically, the computing system could make this selection since this pattern projection may disrupt the projected light pattern emitted and/or detect by the structured light scanner. Moreover, when selecting the type of disturbing illumination, the computing system may also determine disturbing illumination characteristics that should be used, such as frequency of the disturbing illumination and intensity of the disturbing illumination, and may also consider other factors.

Further, the computing system may also select a target location within the physical region towards which the disturbing illumination should be emitted. To do so, the computing system could use determined characteristics of source illumination as a basis for selecting the target location. For example, the illumination characteristics may include a direction of travel of the illumination and this direction could be used by the computing system to determine a location at which the disturbing illumination would intersect with or would otherwise interfere with the sensor system and/or with the source illumination. Other techniques are also possible for selecting the target location.

Once the computing system selects the type of disturbing illumination that should be used as well as the target location, the computing system may then direct the appropriate light source to emit this type of disturbing illumination towards the target location and perhaps may direct the appropriate light source to do so with certain determined disturbing illumination characteristics. With this arrangement, the disclosed methods and system could be thus used to disturb or disable sensor systems of robotic devices. In another aspect, these disclosed methods and systems could also be used to mislead robotic devices, such as by causing a target change in operation of a robotic device. In this manner, these methods and system may ultimately keep robotic devices away from physical regions where these robotic devices should not operate.

II. ILLUSTRATIVE SYSTEMS

Referring now to the figures, FIG. 1A shows an example configuration of a robotic device 100. Robotic device 100 may be any device that has a computing ability and interacts with its surroundings with an actuation capability and/or with ability to emit/generate physical phenomena such as light and/or sound, among others. For instance, the robotic device 100 may be a humanoid robot, a robotic arm, or a quadruped robot, among others. Additionally, the robotic device 100 may also be referred to as a robotic system, a robotic manipulator, or a robot, among others.

The robotic device 100 is shown to include processor(s) 102, data storage 104, program instructions 106, controller 108, sensor(s) 110, power source(s) 112, actuator(s) 114, movable component(s) 116, and emitter(s) 118. Note that the robotic device 100 is shown for illustration purposes only and robotic device 100 may include additional components and/or have one or more components removed without departing from the scope of the disclosure. Further, note that the various components of robotic device 100 may be arranged and connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic device 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices. Further, in addition to the computer-readable program instructions 106, the data storage 104 may include additional data such as diagnostic data, among other possibilities.

The robotic device 100 may include one or more sensor(s) 110 such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others. The sensor(s) 110 may provide sensor data to the processor(s) 102 to allow for appropriate interaction of the robotic device 100 with the environment. Additionally, the robotic device 100 may also include one or more power source(s) 112 configured to supply power to various components of the robotic device 100. Any type of power source may be used such as, for example, a gasoline engine or a battery.

The robotic device 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. With this arrangement, actuator(s) 114 may cause movement of various movable component(s) 116 of the robotic device 100. The moveable component(s) 116 may include appendages such as robotic arms, legs, and/or hands, among others. The moveable component(s) 116 may also include a movable base, wheels, and/or end effectors, among others.

Further, the robotic device 100 may also include one or more emitter(s) 118. Each such emitter 118 may be configured to emit source illumination that is then reflected from objects in the environment and is then detected by sensors (e.g., of the robotic device 100) so as to gain data about the environment in which the robotic device 100 is operating. In practice, an emitter 118 may be incorporated as part of a sensor system (e.g. one of the sensor(s) 110) used for such detection. These sensor systems may include light detection and ranging (LIDAR), a time-of-flight camera, and/or a structured light scanner, among others. In other cases, sensor systems such as stereo cameras may not use an emitter and could instead use other sources of illumination (e.g., natural lighting) that is reflected from objects in the environment and is then detected so as to gain data about the environment in which the robotic device 100 is operating. The following discussion will introduce these sensor systems in greater detail.

In one example, a LIDAR device is an optical remote sensing technology that can be used to obtain information representative of the environment in which the robotic device 100 is positioned. This information may include distances between the LIDAR device and various objects and/or properties of the objects. To obtain this information, the LIDAR device may be configured to illuminate the objects with light (e.g., ultraviolet, visible, or infrared etc.). In particular, the LIDAR device may include a laser scanner that emits many pulses of light over a short time period (e.g., 100,000 pulses of light per second) and measures how long it take each pulse to reflect back to the LIDAR device. These times are used by the LIDAR device to compute the distance each pulse traveled from the scanner to the object off which it reflected. In this manner, the LIDAR device could record many data points in order to generate a three-dimensional (3D) data cloud that is representative of the environment.

In another example, a time-of-flight camera is a range imaging camera system that may resolve distance based on the known speed of light, measuring the time-of-flight of a light signal between the camera and the object for each point of the image. The time-of-flight camera may be considered as a class of scannerless LIDAR, in which the entire scene may be captured with each laser or light pulse, as opposed to point-by-point (e.g., with a laser beam) such as in scanning LIDAR systems. In this manner, the time-of-flight camera may be suitable for real-time applications as the camera may be able to measure the distances within a complete scene with a single shot (e.g., a single light pulse).

In yet another example, a structured light scanner is a 3D scanning device for measuring the 3D shape of an object using projected light patterns and a camera system. More specifically, the scanner may project light in a pattern (e.g., a series of parallel lines) that becomes distorted on the surface of the object. The camera system may capture this distortion and triangulation techniques may then be used to calculate the distance to a specific point on the object, thereby essentially measuring distortions caused by the surface details of the object (e.g., displacement of the parallel lines). As such, the scanner may use such distortions to digitally reconstruct the object in greater detail, such as by exact retrieval of the 3D coordinates of any details on the object's surface.

In yet another example, a stereo camera may include two or more lenses with a separate image sensor for each lens. As noted, these image sensors may use other sources of illumination (e.g., natural lighting) that is reflected from objects in the environment and is then detected so as to gain data about the environment. This arrangement may thus allow the camera to use a stereo photography process to capture 3D images. To do so, each image sensor may capture a separate two-dimensional (2D) image and the camera may offset the images separately to the left and right eye of the viewer. As such, these 2D images may be combined to give the perception of 3D depth to the viewer. Other examples are also possible.

Figure 1B:
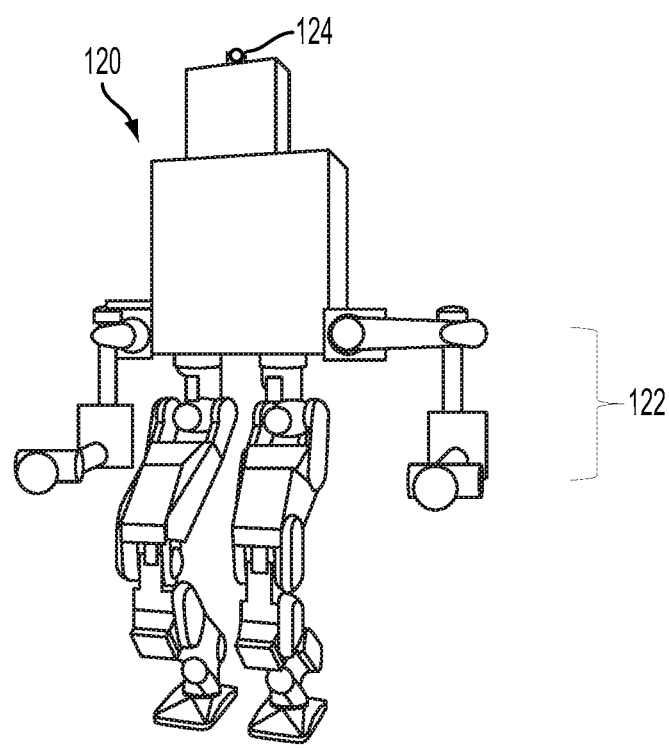
FIG. 1B illustrates an example humanoid robot, according to an example implementation.

A robotic device 100 may take on various forms. To illustrate, refer to FIG. 1B showing an example humanoid robot 120. As shown, the robotic arm 118 includes movable component(s) 116, such as appendage 122, which allow the humanoid robot 120 to move around and interact with the environment. Additionally, the humanoid robot 120 is shown to include a sensor system 124, such as one or more of the sensor systems discussed above. For example, the sensor system 124 may be a LIDAR device, a time-of-flight camera, a structured light scanner, and/or a stereo camera. Of course, the sensor system 124 could also take on other forms.

Figure 2:
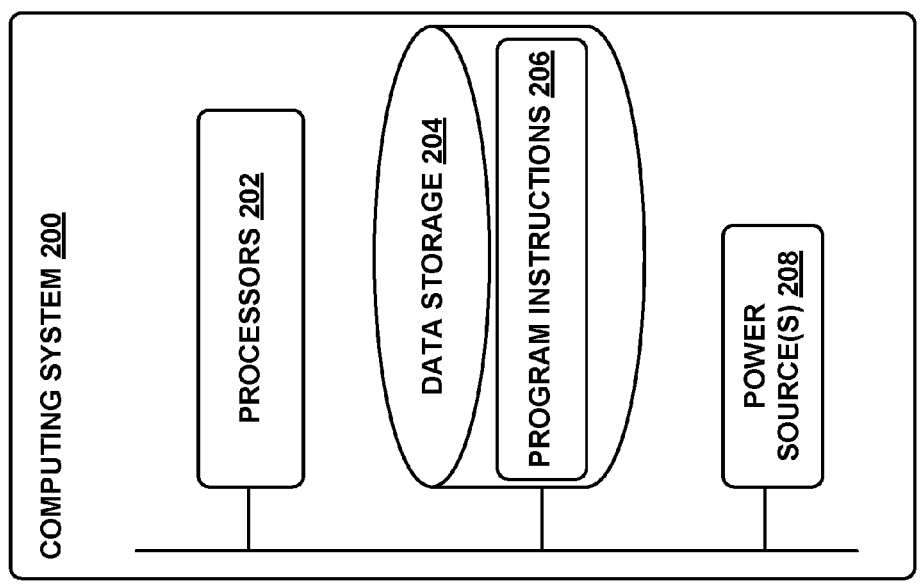
FIG. 2 illustrates components of an example computing system, according to an example implementation.

FIG. 2 is a block diagram showing components of an example computing system 200 that includes one or more processors 202, data storage 204, program instructions 206, and power source(s) 208. Note that the computing system 200 is shown for illustration purposes only and computing system 200 may include additional components and/or have one or more components removed without departing from the scope of the disclosure. Further, note that the various components of computing system 200 may be arranged and connected in any manner.

The above description of processor(s) 102, data storage 104, program instructions 106, sensor(s) 110, and power source(s) 112 may apply to any discussion relating to the respective component being used in another system or arrangements. For instance, as noted, FIG. 2 (among other possible figures) illustrates processors, data storage, program instructions, sensors, and/or power sources as being incorporated in other arrangement. These components at issue may thus take on the same or similar characteristics (and/or form) as the respective components discussed above in association with FIG. 1A. However, the components at issue could also take on other characteristics (and/or form) without departing from the scope of the disclosure. Accordingly, the computing system 200 may take on various forms. For instance, the computing system 200 may take the form of a server, a cloud-based system, a desktop computer, a laptop, a tablet, a wearable computing system, and/or a mobile phone, among other possibilities.

Figure 3A:
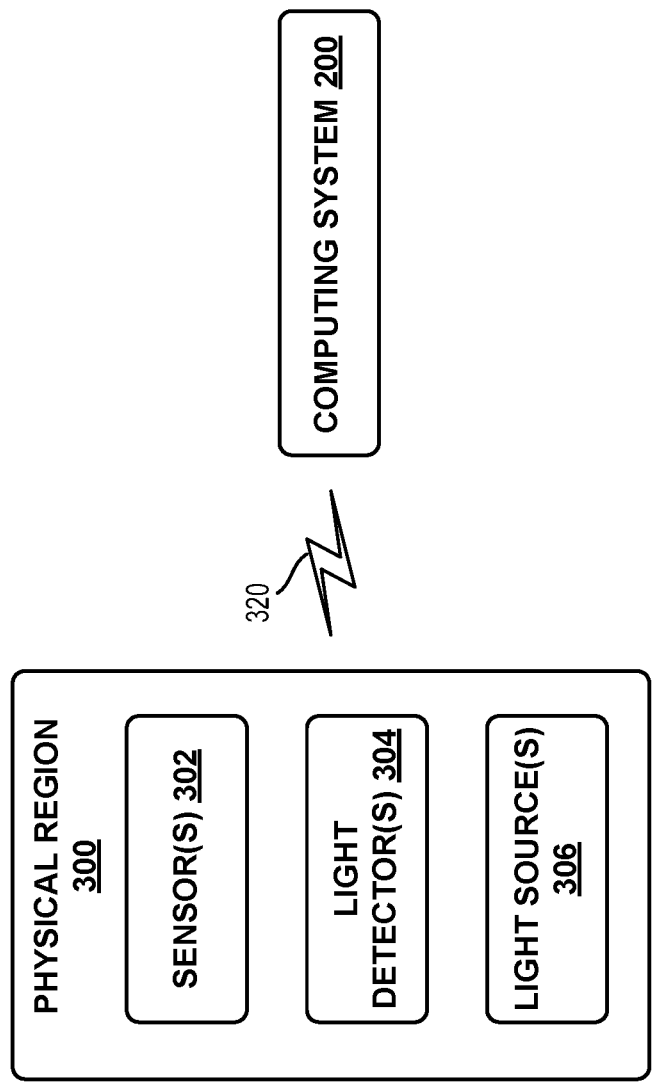
FIG. 3A illustrates components within an example physical region, according to an example implementation.

FIG. 3A then shows an example arrangement including a physical region 300. A physical region 300 may define a portion of an environment in which people, objects, and/or machines may be located. The physical region 300 may take on a two-dimensional or a three-dimensional (3D) form and may be used for various purposes. For instance, the physical region 300 may be used as a retail space, a manufacturing facility, a distribution facility, an office space, a shopping center, and/or an airport, among other examples. Additionally, while a single physical region 300 is shown in FIG. 3A, example implementations may be carried out in the context of a plurality of physical regions.

As shown, the physical region 300 may include one or more sensor(s) 302, such as any of the sensor(s) 110 discussed above in association with FIG. 1A, among others. Additionally, the one or more sensor(s) 302 may be positioned within or in the vicinity of the physical region 300, among other possible locations. Further, an example implementation may also use sensors incorporated within existing devices such as mobile phones, laptops, and/or tablets. These devices may be in possession of people located in the physical region 300 such as consumers and/or employees within a retail space. Additionally or alternatively, these devices may be items on display, such as in a retail space used for sale of consumer electronics for example.

Further, as shown, the physical region 300 may include one or more light detector(s) 304. Each such light detector 304 may be configured to detect light in the physical region 300, such as light emitted by a sensor system of the robotic device 100 for instance. In doing so, the light detector 304 may detect various characteristics of the light, such as frequency and/or intensity of the light, among others. By way of example, the light detector 304 may take the form of a photodetector, among other possibilities.

Yet further, as shown, the physical region 300 may include one or more light source(s) 306. As further discussed in detail below, each such light source 306 may be configured to emit some type of disturbing illumination that is intended to disturb or deceive a sensor system of the robotic device 100. This disturbing illumination may involve visible light and/or may be imperceptible to humans (e.g., infrared (IR) illumination). Moreover, each such light source 306 may be mounted on a ball mount or another mechanical feature that is operable to rotate and/or move the light source 306 such that the emitted disturbing illumination could be directed towards a target location (e.g., within the physical region 300). In other examples, a light source 306 may be mounted on a robotic arm or a 2-axis mount configured to move light source 306. Additionally or alternatively, the light source 306 may include a lens mechanism that is configured to direct the respective emitted disturbing illumination. Other examples are also possible.

The one or more light source(s) 306 could each take on one of various forms. In one example, a light source 306 may be a digital light processing (DLP) projector. A DLP projector may include a light emitter that emits light through a spinning color wheel (e.g., red, green, and blue) onto a DLP chip. The DLP chip containing an array of microscopic mirrors each capable of tilting either towards a light emitter in the DLP projector (e.g. ON state) or away from the light emitter (e.g., OFF state). This allows the mirrors to be turned on and off according to the need for the particular color at the moment. With this arrangement, the colors may follow one another rapidly to result in an image that appears to be constantly lit. In this manner, the DLP projector can project one of various patterns in various shapes and colors.

In another example, a light source 306 may be a light emitting diode (LED). An LED is a PN junction diode that is capable of emitting light when activated. In particular, when proper voltage is applied, electrons may recombine with holes so as to then release energy in the form of photons. Depending on the energy bandgap of the semiconductor, the LED may emit visible light of a certain color or may emit invisible light, such as ultraviolet or infrared for instance. In this manner, different LEDs can emit light of various frequencies and intensities.

In yet another example, a light source 306 may be a light bulb. Generally, the light bulb may produce light with a wire filament that is heated to a high temperature by an electric current that passes through the wire, thereby resulting in a glow of visible light. Depending on various factors, this light may be of varying intensities. Thus, the light bulb may be very bright or may be very dim and may emit such light for one of various durations. Of course, the one or more light source(s) 306 could take on other forms as well.

As noted, different light sources may be configured to emit different types of disturbing illumination. In one example, disturbing illumination may take the form of a spatial variation of light. In particular, the spatial variation may result in lighting at different spatial locations. In some cases, the lighting at different locations may take on different characteristics. Hence, the spatial variation may take the form of a pattern projection. By way of example, the projection may be a dot projection (e.g., a random dot projection) including a plurality of "dots" of light projected onto the environment. Of course, the projection could also take on other shapes and forms. In either case, this spatial variation may be implemented by a DLP projector, among other possibilities. Moreover, as discussed in further detail below, this spatial variation may be effective for disturbing or deceiving a structured-light scanner, such as by disturbing the pattern emitted by the scanner and/or disturbing the distortions detectable by the scanner for instance.

In another example, disturbing illumination may take the form of temporal modulation defining emission of disturbing illumination at particular or varying light characteristics. These light characteristics may involve timing, frequency, phase, and/or intensity of the illumination, among others. By way of example, temporal modulation may involve light flickering at a particular frequency (e.g., 10 kHz). Of course, the temporal modulation could also take on other forms. In either case, this temporal modulation may be implemented by one or more LEDs, among other possibilities. Moreover, as discussed in further detail below, this temporal modulation may be effective for disturbing or deceiving a time-of-flight camera and/or a LIDAR device, such as by disturbing the light pulses emitted by such systems and/or the reflected light pulses detected by such systems for instance.

In yet another example, disturbing illumination may take the form of light flooding defining emission of disturbing illumination at a relatively high light intensity for some time period. By way of example, this light flooding may be implemented by a light bulb capable of emitting light at a relatively high intensity (e.g., a bright light bulb), among other possibilities. Moreover, as discussed in further detail below, this light flooding may be effective for disturbing or deceiving any of the sensor systems discussed above, such as by overloading the sensor systems with light information and thus interrupting the sensor system's ability to properly carry out the intended illumination detection for instance. Other examples are also possible.

FIG. 3A also depicts the computing system 200 discussed above in association with FIG. 2. This computing system 200 may be positioned within the physical region 300 or outside of the physical region 300. In either case, the computing system 200 may receive data from and/or transmit data to the sensors 302, the light detector(s) 304, and/or the light source(s) 306 of the physical region 300. As shown, this transmission of data may occur via a communication link 320. Communication link 320 may include a wired link and/or a wireless link (e.g., using various wireless transmitters and receivers). A wired link may include, for example, a parallel bus or a serial bus such as a Universal Serial Bus (USB). A wireless link may include, for example, Bluetooth, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11).

In other examples, the arrangement may include access points through which the sensors 302, the light detector(s) 304, the light source(s) 306, and/or computing system 200 may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

Figure 3B:
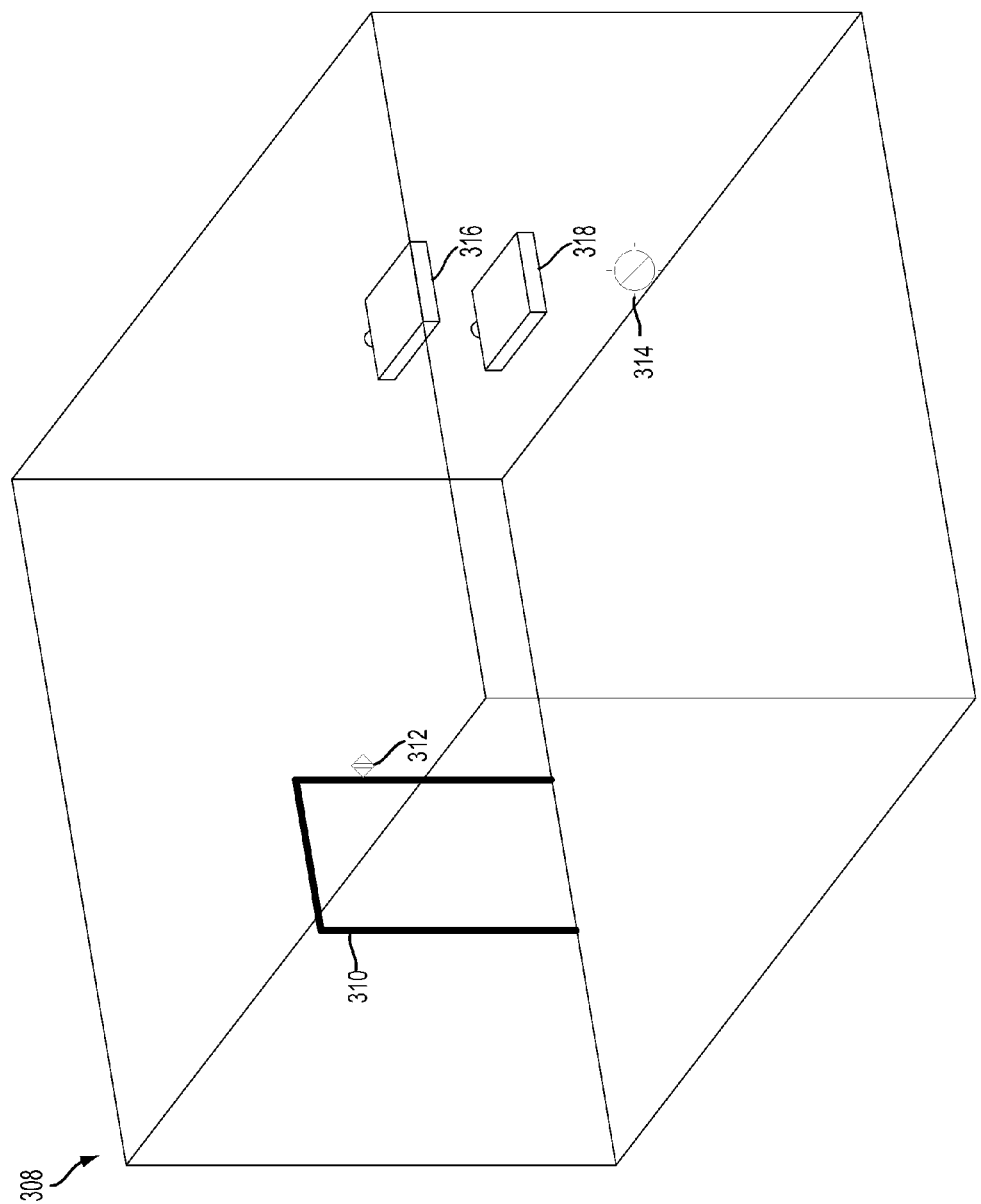
FIG. 3B illustrates an example physical region, according to an example implementation.

FIG. 3B shows an example physical region 308 including an entrance/exit 310 for entering and exiting the physical region 308. As shown, the physical region 308 includes a proximity sensor 312 configure to detect entry (and exit) of actors to the physical region 308 via the entrance 310. Of course, the physical region 308 may also include other sensors. Additionally, the physical region 308 is shown to include a light detector 314 positioned near a wall of the physical region 308. This light detector 314 could take the form of the light detector(s) 304, among other possibilities. Of course, the physical region 308 may include more than one light detector. Further, the physical region 308 is shown to include light sources 316 and 318 each taking the form of one of the light source(s) 306 discussed above, among other possibilities. These light sources 316 and 318 may be positioned anywhere within the physical region 308. Of course, while two light sources are shown, the physical region 308 may include any number of light sources. Note that this example region 308 is shown for illustration purposes only and is not meant to be limiting as other example physical regions are also possible.

III. ILLUSTRATIVE METHODS

Figure 4:
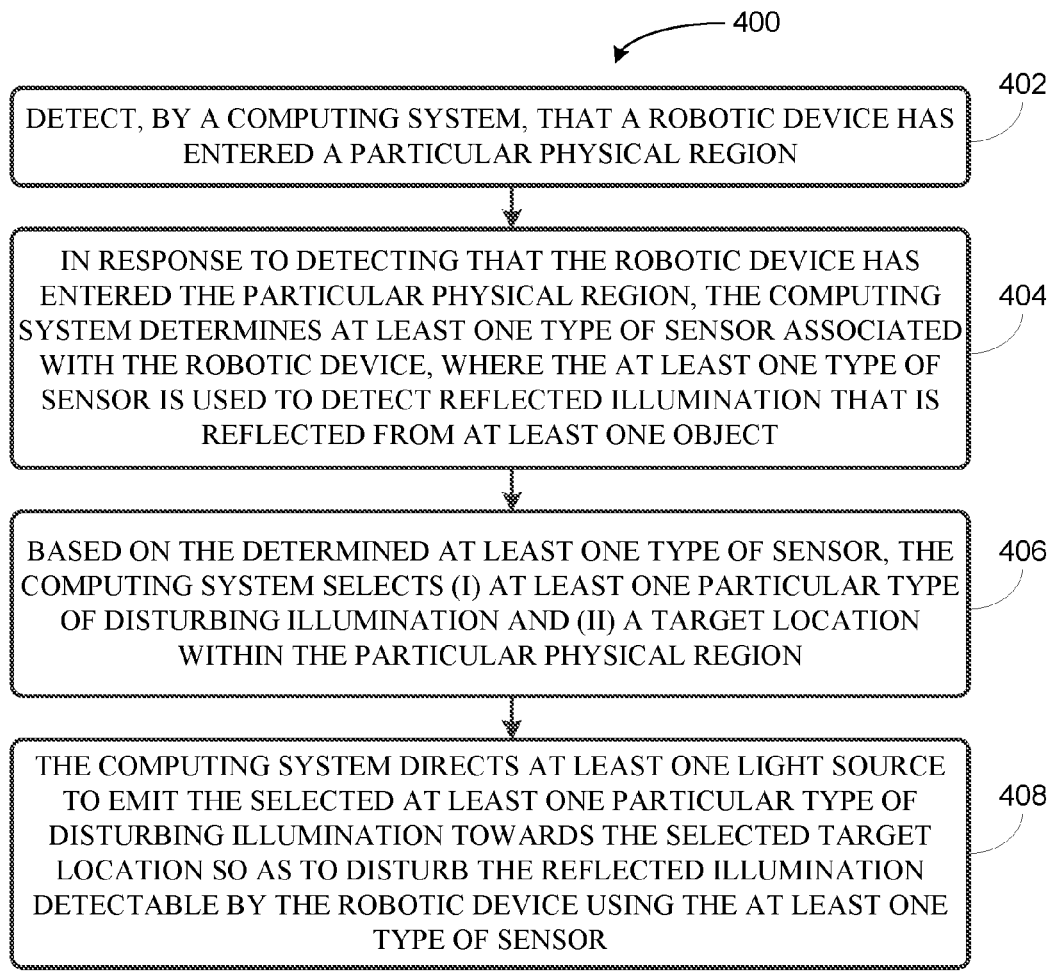
FIG. 4 is an example flowchart for selecting at least one type of disturbing illumination, according to an example implementation.

FIG. 4 is a flowchart illustrating a method 400, according to an example implementation. In particular, method 400 may be implemented to cause a light source in a physical region to emit disturbing illumination towards a target location within the physical region, so as to disturb or deceive a sensor system of a robotic device.

Method 400 shown in FIG. 4 (and other processes and methods disclosed herein) presents a method that can be implemented within an arrangement involving, for example, the robotic device 100, the computing system 200 and/or components of the physical region 300 (or more particularly by one or more components or subsystems thereof, such as by a processor and a non-transitory computer-readable medium having instructions that are executable to cause the device to perform functions described herein). Additionally or alternatively, method 400 may be implemented within any other arrangements and systems.

Method 400 and other processes and methods disclosed herein may include one or more operations, functions, or actions as illustrated by one or more of blocks 402-408. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 200 and other processes and methods disclosed herein, each block in FIG. 2 may represent circuitry that is wired to perform the specific logical functions in the process.

At block 402, method 400 involves detecting, by a computing system (e.g., computing system 200), that a robotic device (e.g., robotic device 100) has entered a particular physical region (e.g., physical region 300).

In an example implementation, detecting that the robotic device 100 has entered the physical region 300 may involve detecting that any portion of the robotic device 100 is within the coordinates of the physical region 300. Alternatively, detecting that the robotic device 100 has entered the physical region 300 may involve detecting that the robotic device 100 is about to enter the physical region 300. Hence, this may involve detecting that the robotic device 100 has entered a physical region that is in the vicinity of the physical region 300 at issue, such as by being located within a threshold distance of the physical region 300 for instance. In either case, various techniques may be used to detect that the robotic device 100 has entered or is about to enter the physical region 300.

In one example, the physical region 300 may include at least one camera configured to provide to the computing system 200 image data representative of the physical region 300. One of various image processing techniques may then be used to determine that the robotic device 100 has entered the physical region 300. For instance, the computing system 200 may determine the outline of the robotic device 100 within the image data and may then refer to mapping data to determine that the outline substantially matches an outline of a robotic device. With this arrangement, the computing system 200 may thus use image data to determine that the robotic device 100 entered the physical region 300 and could also use the image data to identify various characteristics of the robotic device 100. These characteristics may include manufacturer, make, model, type, size, shape, and/or color of the robotic device 100, among others.

In another example, the robotic device 100 may be configured to emit (e.g., continuously or from time-to-time) wireless signals having encoded thereon identification information associated with the robotic device 100. The physical region 300 may then have a wireless receiver configured to receive such signals and to transmit such signals to the computing system 200. The computing system 200 may then decode such received signals to receive the identification information. As such, the computing system 200 may use the identification information to determine that the robotic device 100 has entered the physical region 300 as well as to identify the various characteristics of the robotic device 100.

In yet another example, as noted, the robotic device 100 may include one or more emitter(s) 118 each configured to emit source illumination. Additionally, as noted, the physical region 300 may include one or more light detector(s) 304 each configured to detect light in the physical region 300, such as light emitted by an emitter 118 of the robotic device 100 for instance. With this arrangement, a light detector 304 may detect light emitted by an emitter 118 of the robotic device 100 and may transmit to the computing system 200 information related to the detected light. The computing system 200 may then use the received information to determine characteristics of the detected light. Based on these characteristics, the computing system 200 may make a determination that the detected light originated from an emitter (e.g., rather than being natural lighting), such as an emitter 318 of the robotic device 100. To do so, the computing system 200 could refer to mapping data that maps certain light characteristics to certain sources of light and could use the mapping data to make this determination. Moreover, as further discussed below, these light characteristics may be used to identify the various characteristics of the robotic device 100 and/or characteristics of the sensor system used by the robotic device 100.

In yet another example, one or more sensors, such as proximity and/or motion sensors, may be used to detect that the robotic device 100 has entered the physical region 300. Such sensors could be used in combination with the above-mentioned techniques to also identify the robotic device 100. Of course, other example techniques (and/or combination of the above techniques) could also be used to detect that the robotic device 100 has entered the physical region 300 and/or to identify the robotic device 100.

Figure 5A:
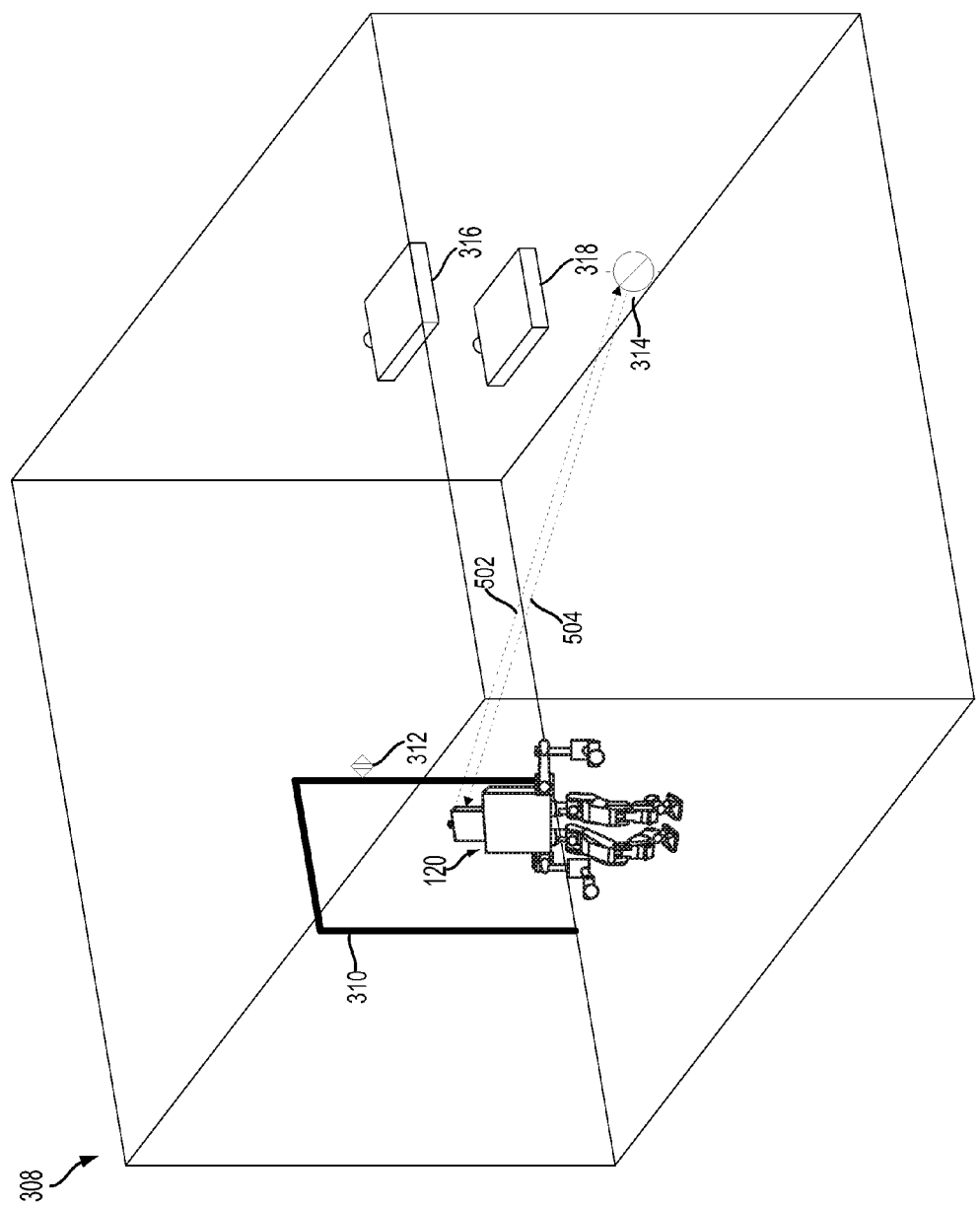
FIG. 5A illustrates the example humanoid robot within the example physical region, according to an example implementation.

FIG. 5A illustrates example entry of the humanoid robot 120 into the physical region 308 via entrance 310. As noted, the physical region 308 includes a proximity sensor 312 configure to detect entry (and exit) of actors to the physical region 308 via the entrance 310. Hence, the proximity sensor 312 may detect entry of the humanoid robot 120 into the physical region 308 and may inform the computing system 200 that an actor has entered the physical region 308. Moreover, as noted, the physical region 308 includes a light detector 314 positioned near a wall of the physical region 308. This light detector 314 may detect source illumination 502 (e.g., presented in the form of a dashed arrow directed at the light detector 314) emitted from the sensor system 124 of the humanoid robot 120. The above-mentioned light detector techniques could then be used to determine that the humanoid robot 120 has entered the physical region 308 and/or to identify the humanoid robot 120. Other illustrations are also possible.

At block 404, method 400 involves, in response to detecting that the robotic device has entered the particular physical region, the computing system determining at least one type of sensor associated with the robotic device, where the at least one type of sensor is used to detect reflected illumination that is reflected from at least one object.

In an example implementation, once the computing system 200 determines that the robotic device 100 entered the physical region 300, the computing system 200 may then determine the type of sensor system (i.e., the at least one type of sensor) used by the robotic device 100. For instance, the computing system 200 may determine whether the sensor system includes a LIDAR device, a time-of-flight camera, a structured light scanner and/or a stereo camera. The computing system 200 may do so by identifying the robotic device 100 (e.g., using the above-mentioned techniques) and then determining the sensor system used by the identified robotic device 100, such as by referring to mapping data that maps certain robotic devices (e.g., certain robotic device models) to certain sensor systems. Alternatively, the computing system 200 may directly determine the sensor system and may do so in one of various ways.

For instance, as noted, the robotic device 100 may include at least one emitter 118 that is used to emit source illumination. This source illumination may be emitted towards an object and could be reflected off the object to result in reflected illumination that could then be detectable by the sensor system of the robotic device 100. When the source and/or reflected illumination travel through the physical region 300, at least one light detector 304 could detect one or both of the source and reflected illumination. In doing so, the light detector may generate a signal containing information related to detection of the source (and/or reflected) illumination and the computing system 200 may then receive the signal containing this information. In this instance, once the computing system 200 receives this information, the computing system 200 may then use this information to determine characteristics of the source (and/or reflected illumination). The computing system 200 may do so using various signal processing techniques currently known or developed in the future or may use other techniques. In either case, the computing system 200 may determine one or more of various characteristics of the source (and/or reflected) illumination.

In one example, the computing system 200 may determine an intensity of the illumination. This may specifically involve determining a measure of radiant intensity, a measure of luminous intensity, a measure of irradiance, and/or a measure of radiance, among others. In another example, the computing system 200 may determine a frequency and/or a wavelength of the illumination. In yet another example, the computing system 200 may determine a phase of the illumination. This may specifically involve determining a fraction of a light wave cycle that has elapsed relative to origin of the light wave. Additionally or alternatively, this may involve determining a distance between light waves, such as between a light wave of the illumination and a light wave of natural room lighting for instance. In yet another example, the computing system 200 may determine a direction of travel of the illumination, such as by determining an angle of incidence of the illumination when the illumination arrives at the surface of the light detector 304 for instance. In yet another example, the computing system 200 may determine duration of the illumination, such as by determining a duration for which the illumination is detected by the light detector 304 for instance. In yet another example, the computing system 200 may determine a pattern of the illumination, such as by determining distribution of light intensity across the surface of the light detector 304 for instance. Other examples are also possible.

Once the computing system 200 determines the characteristics of the source (and/or reflected) illumination, the computing system 200 may use the determined characteristics as a basis for determining the type of sensor system used by the robotic device 100. For instance, the computing system 200 may do so by referring to mapping data that maps certain combinations of illumination characteristics to certain sensor systems due to different sensor systems likely emitting illumination having somewhat different illumination characteristics. Based on this mapping data, the computing system 200 may then determine at least one type of sensor system likely being used by the robotic device 100. Of course, the computing system 200 could also determine the type of sensor system in other ways.

As noted, FIG. 5A shows the light detector 314 that may detect source illumination 502 emitted from the sensor system 124 of the humanoid robot 120. FIG. 5A also shows reflected illumination 504 that is reflected off the light detector 314. While FIG. 5A shows detection of the source illumination 502 by the light detector 314, the source illumination 502 could reflect off a different object within the physical region 308 to results in reflected illumination 504 that is then detectable by the light detector 314. As such, FIG. 5A is shown for illustration purposes only and is not meant to be limiting.

At block 406, method 400 involves, based on the determined at least one type of sensor, the computing system selecting (i) at least one particular type of disturbing illumination and (ii) a target location within the particular physical region.

In an example implementation, once the computing system 200 determines the type of sensor system used by the robotic device 100, the computing system 200 may use the determined sensor system as a basis for determining a type of disturbing illumination that should be used to disturb the sensor system. To do so, the computing system 200 could refer to mapping data that maps certain sensor systems to certain types of disturbing illumination and could then select the type of disturbing illumination based on this mapping data. In some cases, the mapping data may indicate multiple types of disturbing illumination that could be used to disturb a particular sensor system. In such cases, the computing system 200 may also consider other factors when selecting between multiple potential types of disturbing illumination. Such other factor may include, but are not limited to: location of the robotic device 100 within the physical space, characteristics of the source (and/or reflected illumination) and/or the target location further discussed in detail below, among others.

Further, in addition to determining the type of disturbing illumination that should be used to disturb the sensor system, the computing system 200 could also determine a combination of one or more characteristics of the disturbing illumination with which the disturbing illumination should be applied. To determine the combination, the computing system 200 could refer to mapping data that maps certain sensor systems to certain combinations of characteristics of disturbing illumination and could then select the combination of the characteristics based on this mapping data. If the mapping data indicates multiple possible combinations that could be used, the computing system 200 may also consider other factors to selecting between multiple such combinations, such as by considering the above-mentioned other factors.

In another example implementation, as noted, the computing system 200 could determine characteristics of the source (and/or reflected) illumination. In this implementation, the computing system 200 could refer to mapping data that maps certain characteristics of the source (and/or reflected) illumination to certain types of disturbing illumination that could be used to disturb this source (and/or reflected) illumination detectable by a sensor system. The computing system 200 may then use this mapping data to determine the type of disturbing illumination. Further, the computing system 200 could also refer to mapping data that maps certain characteristics of the source (and/or reflected) illumination to certain combinations of characteristics of disturbing illumination and could then select the combination of the characteristics based on this mapping data. In a similar manner to the implementation discussed above, the computing system 200 could consider other factors when determining that there are multiple possible selections based on mapping data. Other implementations are also possible.

The above-mentioned characteristics of the disturbing illumination could take various forms and could each be used in various ways. In one example, the computing system 200 may determine intensity of the disturbing illumination. For instance, the computing system 200 may select a disturbing illumination intensity that is higher than a determined intensity of the source (and/or reflected) illumination, so as to cause the sensor system to detect a false intensity for example. In another example, the computing system 200 may determine frequency of the disturbing illumination. For instance, the computing system 200 may select a disturbing illumination frequency that is different than a determined frequency of the source (and/or reflected) illumination, so as to cause the sensor system to detect a false frequency or set of frequencies for example. In yet another example, the computing system 200 may determine a phase of the disturbing illumination. For instance, the computing system 200 may select a phase for the disturbing illumination that is different than a determined phase of the source (and/or reflected) illumination, so as to result in destructive interference between light waves of the disturbing illumination and light waves of the source (and/or reflected) illumination.

In yet another example, the computing system 200 may determine a direction of travel for the disturbing illumination. For instance, the computing system 200 may determine a direction of travel that would cause the disturbing illumination to intersect with the source (and/or reflected) illumination in at least one location of the physical region 300. Moreover, determining this direction of travel may be further based on the target location as further discussed below. In yet another example, the computing system 200 may determine a duration for which the disturbing illumination should be emitted. For instance, the computing system 200 may determine that the disturbing illumination should be emitted for as long as source (and/or reflected) illumination is being detected. In yet another example, the computing system 200 may determine a pattern of the disturbing illumination. For instance, the computing system 200 may select a pattern for the disturbing illumination that is different than a determined pattern of the source (and/or reflected) illumination), so as to cause the sensor system to detect a false pattern for example. Of course, other characteristics and example uses are also possible.

Specific scenarios will now be discussed with regards to selection of specific types of disturbing illumination for various types of sensor systems, such as for the various sensor systems discussed above. Note that these scenarios are provided for exemplary purposes only and are not meant to be limiting.

In one example scenario, if the computing system 200 determines that the sensor system used by the robotic device 100 is a structured light scanner, the computing system 200 may select a spatial variation as the type of disturbing illumination that should be used. As noted above, a structured light scanner is a 3D scanning device for measuring the 3D shape of an object using projected light patterns and a camera system. Since the spatial variation may take the form of a pattern projection (e.g., a random dot projection), this pattern projection may disrupt the projected light pattern emitted and/or detect by the structured light scanner.

In another example scenario, if the computing system 200 determines that the sensor system used by the robotic device 100 is a time-of-flight camera and/or a LIDAR device, the computing system 200 may select temporal modulation as the type of disturbing illumination that should be used. As noted above, a LIDAR device may emit many light pulses for capturing a scene while time-of-flight cameras may emit a single such light pulse for capturing a scene. In either case, such light pulses could be disturbed using temporal modulation because temporal modulation involves emission of disturbing illumination at particular or varying light characteristics, such as particular or varying timing, frequency, phase, and/or intensity of the illumination. By way of example, temporal modulation may involve light flickering at a particular frequency (e.g., 10 kHz). This may cause a LIDAR device and/or a time-of-flight camera to detect such light flickering and may make it difficult for such sensor systems to distinguish between the reflected light pulses and the light flickering, thereby resulting in false detection. Moreover, given the number of light pulses used by LIDAR device, temporal modulation may be emitted with a high light intensity to disturb a LIDAR device compared to the light intensity that may be used to disturb a time-of-flight camera.

In yet another example scenario, if the computing system 200 determines that the sensor system used by the robotic device 100 is a stereo camera, the computing system 200 may select light flooding as the type of disturbing illumination that should be used. The computing system 200 could make this selection since light flooding may be effective for disturbing or deceiving any most sensor systems, such as by overloading the sensor systems with light information and thus interrupting the sensor system's ability to properly carry out the intended illumination detection for instance. Hence, if the computing system 200 determines that any of the above-mentioned sensor systems are used by the robotic device 100, the computing system 200 may select light flooding as the type of disturbing illumination that should be used and may do so in addition or alternatively to the other possible selections discussed above. Other example scenarios are also possible.

In this manner, the computing system 200 may use such techniques to select a type of disturbing illumination. In doing so, if the computing system 200 selects a particular type of disturbing illumination, the computing system 200 may select a single light source that would emit this particular type of disturbing illumination or may select two or more light sources that would each emit this particular type of disturbing illumination. In the event that two or more light sources are selected, each light source may emit this particular type of disturbing illumination with the same characteristics or different light sources may emit this particular type of disturbing illumination with different characteristics.

In other situations, the computing system 200 could select two or more types of disturbing illumination that should be used. In such situations, the computing system 200 may select at least one light source for each type of selected disturbing illumination. Other situations are also possible.

In a further aspect, the disturbing illumination may be used for causing the sensor system to detect certain illumination that would ultimately result in a target change in operation of the robotic device 100. Accordingly, the computing system 200 may determine a target change in operation of the robotic device 100. By way of example, referring again to FIG. 5A, the computing system 200 may seek to cause the humanoid robot 120 to turn around and exit the physical region 308 via exit 310.

To cause the target change in operation, the computing system 200 may determine a particular type of disturbing illumination and/or particular disturbing illumination characteristics that would result in this target change. For instance, the computing system 200 may determine a particular light pattern that, once detected by the sensor system, would be interpreted by the robotic device 100 as the robotic device 100 being positioned in an environment that is different than the environment where the robotic device is actually positioned. By way of example, the computing system 200 may determine a pattern that would cause the humanoid robot 120 to interpret the detection as though the humanoid robot 120 is positioned within close proximity to a wall. This may thus cause a change in operation of the humanoid robot 120 that would result in the humanoid robot 120 turning around and exiting the physical region 308 via the exit 310. Of course, other examples are also possible.

As noted above, based on the determined sensor system and/or other factors, the computing system 200 could also select a target location within the physical region 300 towards which the disturbing illumination should be emitted. The computing system 200 could make this selection in various ways. For example, the computing system 200 may use determined characteristics of source (and/or reflected) illumination as a basis for selecting the target location. For example, the illumination characteristics may include a direction of travel of the illumination. In this example, the computing system 200 could determine location of the sensor system and/or the direction of travel of the illumination and, based on such determinations, then determine optimal locations at which the disturbing illumination would intersect with or would otherwise interfere with the sensor system and/or with the source (and/or reflected) illumination.

In another example, the computing system 200 may determine the target location by observing (e.g., using image data) the sensor system of the robotic device 100 and then determining orientation of the sensor system. In doing so, the computing system 200 may select the target location based at least in part on the orientation of the sensor system, such as by ensuring that the disturbing illumination arrives at a portion of the sensor system (e.g., a light detector within the sensor system) that would then disturb the sensor system. In yet another example, the computing system 200 may determine areas within the physical region 300 for which the robotic device 100 should receive false data and could then select such areas as target locations. Moreover, in this regard, the computing system 200 could select different areas for different types of robotic devices.

An optimal target location could be at one of various locations. In one example, the target location may be a location along the path of travel of the source illumination. In another example, the target location may be a location along the path of travel of the reflected illumination. In yet another example, the target location may be a location where the source illumination is reflected off an object to result in the reflect illumination. In yet another example, the target location may be the location of the sensor system. In yet another example, the target location may be a location where the path of travel of the source illumination is sufficiently near (e.g., within a threshold distance of) the path of travel of the reflected illumination, so as to simultaneously disturb both the source and reflected illumination. Other examples are also possible.

Further, in the event that two or more light sources are selected for emitting disturbing illumination, each light source may emit disturbing illumination towards the same target location. This may specifically involve the light sources emitting this disturbing illumination simultaneously or different source doing so at different times. Alternatively, in the event that two or more light sources are selected for emitting disturbing illumination, different light source may emit disturbing illumination towards different target location. Similarly, in this case the light sources may emit this disturbing illumination simultaneously or different light sources may do so at different times. Whereas, in the event that a single light source is selected for emitting disturbing illumination, this light source may (e.g., continuously or from time-to-time) emit disturbing illumination towards the same target location. Alternatively, in the event that a single light source is selected for emitting disturbing illumination, this light source may emit disturbing illumination towards different target locations at different times. Other example approaches are also possible.

At block 408, method 400 involves, the computing system directing at least one light source to emit the selected at least one particular type of disturbing illumination towards the selected target location so as to disturb the reflected illumination detectable by the robotic device using the at least one type of sensor.

In an example implementation, once the computing system 200 determines the type of disturbing illumination to use and the target location, the computing system 200 may then direct the appropriate light source to emit the selected type of disturbing illumination towards the selected target location. Moreover, if a specific combination of disturbing illumination characteristics were selected, the computing system 200 may then direct the appropriate light source to emit the selected type of disturbing illumination towards the selected target location and to do so with the selected characteristics. Once the appropriate light source emits the selected type of disturbing illumination towards the selected target location, this disturbing illumination may disturb the sensor system, the source (and/or reflected) illumination, and/or may cause an target change in operation of the robotic device.

Figure 5B:
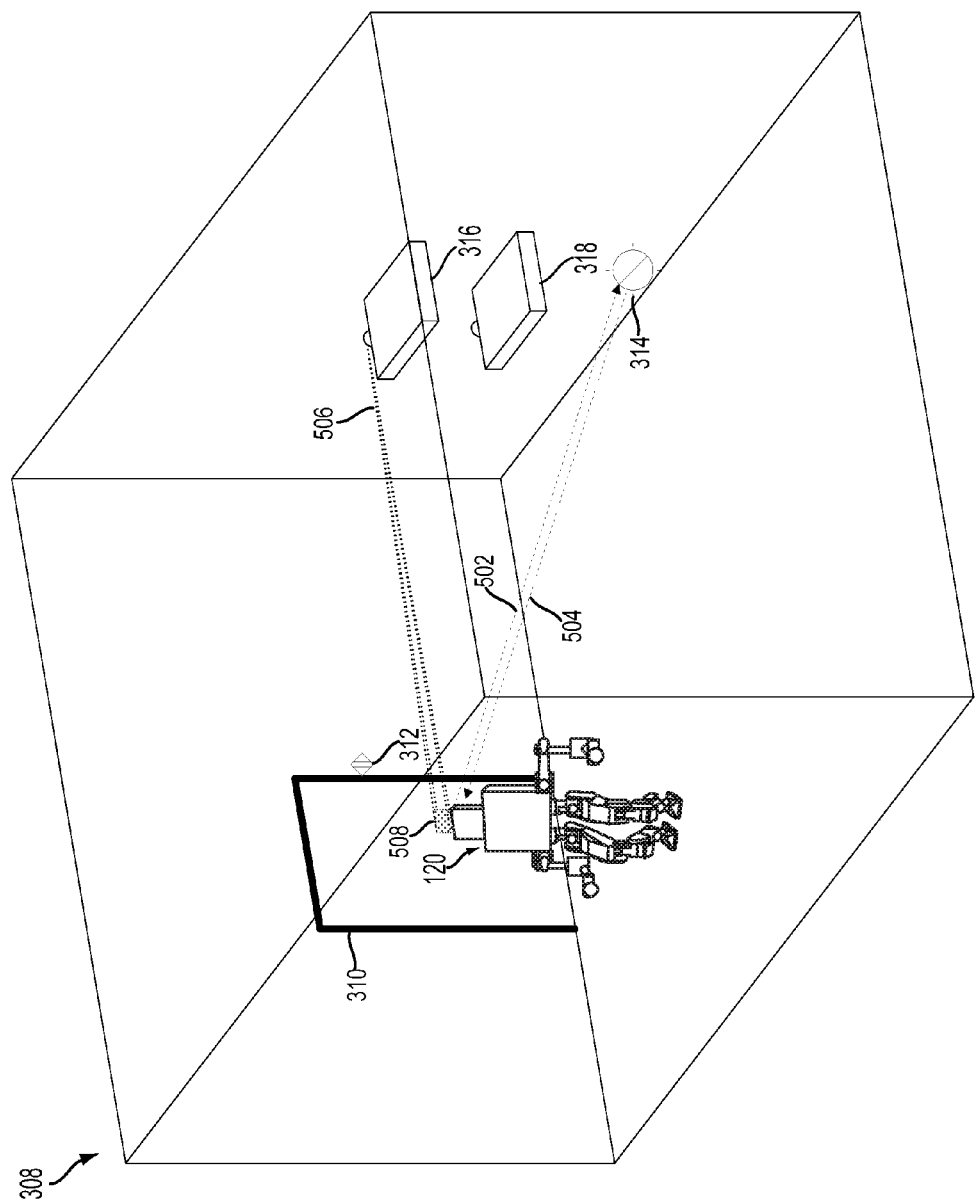
FIG. 5B illustrates example disturbing illumination within the example physical region, according to an example implementation.

FIG. 5B illustrates an example emission of disturbing illumination. As shown, light source 316 emits disturbing illumination 506 towards a target location 508. In particular, this disturbing illumination 506 may be spatial variation and is shown as arriving at the target location 508 in the form of a dot pattern projection. The target location 508 is located in such a way that that the reflected illumination 504 is disturbed by the disturbing illumination 506. In particular, the target location 508 is shown as located at the sensor system 124 but may be everywhere on the surfaces in the physical region 308. In some cases, the disturbing illumination 506 could be reflected off participating media (e.g., dust, fog, or other impurities) and thus the target location 508 could also be the location of such participating media. Other cases and illustrations are also possible.

IV. CONCLUSION

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

I claim:

1. A method comprising:
    receiving, at a computing system, a light emission detection from a light sensor system located in a physical space, the light emission detection indicating:
        a presence of a robot in the physical space; and
        at least one characteristic of emitted light from the robot into the physical space;
    determining, by the computing system, a type of a sensor system of the robot based on the at least one characteristic of the emitted light; and
    commanding, by the computing system, a light source in the physical space to emit a light disturbance into the physical space based on the determined type of the sensor system of the robot, the light disturbance configured to disrupt sensor system of the robot.

2. The method of claim 1, wherein the at least one characteristic of the emitted light comprises one or more of: (i) an intensity of the emitted light, (ii) a frequency of the emitted light, (iii) a phase of the emitted light, (iv) a direction of travel of the emitted light, (v) a duration of the emitted light, and (vi) a pattern of the emitted light.

3. The method of claim 1, further comprising:
    determining, by the computing system, a target change in operation of the robot;
    determining, by the computing system, illumination characteristics of the light disturbance causing the determined target change in operation of the robot; and
    commanding, by the computing system, the light source in the physical space to emit an altered light disturbance into the physical space based on the determined illumination characteristics causing the determined target change in the operation of the robot.

4. The method of claim 1, wherein the sensor system of the robot comprises one or more of: (i) a light detection and ranging (LIDAR) device; (ii) a time-of-flight camera; (iii) a structured light scanner; and (iv) a stereo camera.

5. The method of claim 1, wherein the light source comprises one or more of: (i) a digital light processing (DLP) projector; (ii) a light emitting diode (LED); and (iii) a light bulb.

6. The method of claim 1, wherein the emitted light disturbance comprises one or more of: (i) spatial variation, (ii) temporal modulation, and (iii) light flooding.

7. The method of claim 1, further comprising:
    when the determined type of the sensor system of the robot comprises a structured light scanner, selecting, by the computing system, the light disturbance as one or more of (i) a spatial variation and (ii) light flooding;
    when the determined type of the sensor system of the robot comprises a light detection and ranging (LIDAR) device, selecting, by the computing system, the light disturbance as one or more of (i) temporal modulation and (ii) light flooding;
    when the determined type of the sensor system of the robot comprises a time-of-flight camera, selecting, by the computing system, the light disturbance as one or more of (i) temporal modulation and (ii) light flooding; and
    when the determined type of the sensor system of the robot comprises a stereo camera, selecting, by the computing system, the light disturbance as light flooding.

8. A system comprising:
    data processing hardware; and
    memory hardware in communication with the data processing hardware, the memory hardware storing instructions that when executed on the data processing hardware cause the data processing hardware to perform operations comprising:
    receiving a light emission detection from a light sensor system located in a physical space, the light emission detection indicating:
        a presence of a robot in the physical space; and
        at least one characteristic of emitted light from the robot into the physical space;
    determining a type of a sensor system of the robot based on the at least one characteristic of the emitted light; and
    commanding a light source in the physical space to emit a light disturbance into the physical space based on the determined type of the sensor system of the robot, the light disturbance configured to disrupt sensor system of the robot.

9. The system of claim 8, wherein the at least one characteristic of the emitted light comprises one or more of: (i) an intensity of the emitted light, (ii) a frequency of the emitted light, (iii) a phase of the emitted light, (iv) a direction of travel of the emitted light, (v) a duration of the emitted light, and (vi) a pattern of the emitted light.

10. The system of claim 8, wherein the operations further comprise:
  determining a target change in operation of the robot;
  determining illumination characteristics of the light disturbance causing the determined target change in operation of the robot; and
  commanding the light source in the physical space to emit an altered light disturbance into the physical space based on the determined illumination characteristics causing the determined target change in the operation of the robot.

11. The system of claim 8, wherein the sensor system of the robot comprises one or more of: (i) a light detection and ranging (LIDAR) device; (ii) a time-of-flight camera; (iii) a structured light scanner; and (iv) a stereo camera.

12. The system of claim 8, wherein the light source comprises one or more of: (i) a digital light processing (DLP) projector; (ii) a light emitting diode (LED); and (iii) a light bulb.

13. The system of claim 8, wherein the emitted light disturbance comprises one or more of: (i) spatial variation, (ii) temporal modulation, and (iii) light flooding.

14. The system of claim 8, wherein the operations further comprise:
  when the determined type of the sensor system of the robot comprises a structured light scanner, selecting the light disturbance as one or more of (i) a spatial variation and (ii) light flooding;
  when the determined type of the sensor system of the robot comprises a light detection and ranging (LIDAR) device, selecting the light disturbance as one or more of (i) temporal modulation and (ii) light flooding;
  when the determined type of the sensor system of the robot comprises a time-of-flight camera, selecting the light disturbance as one or more of (i) temporal modulation and (ii) light flooding; and
  when the determined type of the sensor system of the robot comprises a stereo camera, selecting the light disturbance as light flooding.

15. The method of claim 1, further comprising:
  identifying, by the computing system, the robot based on the at least one characteristic of the emitted light from the robot into the physical space; and
  determining, by the computing system, the type of the sensor system of the robot by referring to mapping data that maps identifications of robots to certain sensor systems.

16. The system of claim 8, wherein the operations further comprise:
  identifying the robot based on the at least one characteristic of the emitted light from the robot into the physical space; and
  determining the type of the sensor system of the robot by referring to mapping data that maps identifications of robots to certain sensor systems.

17. The method of claim 1, wherein the light emission detection comprises a detection of one or more of the emitted light from the robot into the physical space and a reflected illumination of the emitted light from the robot into the physical space.

18. The system of claim 8, wherein the light emission detection comprises a detection of one or more of the emitted light from the robot into the physical space and a reflected illumination of the emitted light from the robot into the physical space.

19. The method of claim 1, further comprising determining, by the computing system, a location of the robot within the physical space based on the light emission detection, wherein the light disturbance is based on the location of the robot.

20. The system of claim 8, wherein the operations further comprise determining a location of the robot within the physical space based on the light emission detection, wherein the light disturbance is based on the location of the robot.

* * * * *